United States Patent [19]

Tsuda

[11] 4,204,621
[45] May 27, 1980

[54] ROLL SHEET FEEDING DEVICE

[75] Inventor: Hiroshi Tsuda, Mitaka, Japan

[73] Assignee: Olympus Optical Company Limited, Tokyo, Japan

[21] Appl. No.: 916,043

[22] Filed: Jun. 14, 1978

[30] Foreign Application Priority Data

Jun. 17, 1977 [JP] Japan .................................. 52-71150

[51] Int. Cl.$^2$ ...................... B65H 17/26; G03B 29/00
[52] U.S. Cl. ........................................ 226/137; 355/28
[58] Field of Search ............... 226/137, 138, 139, 141, 226/133, 135, 136; 355/28, 29

[56] References Cited

U.S. PATENT DOCUMENTS

| | | | |
|---|---|---|---|
| 3,289,532 | 12/1966 | Baumgarten | 355/28 |
| 3,637,305 | 1/1972 | Tanaka | 355/28 |
| 3,664,220 | 5/1972 | Blair | 226/137 |
| 4,143,566 | 3/1979 | Laciak | 226/141 |

*Primary Examiner*—Edward J. McCarthy
*Attorney, Agent, or Firm*—Haseltine, Lake & Waters

[57] ABSTRACT

A roll sheet feeding device comprising a sheet feed roller for feeding a roll sheet, and a stopping means for stopping said sheet feed roller at least one predetermined position, said means being provided in a midway of a passage through which a driving force is to be transmitted to said sheet feed roller, a diameter and an amount of rotation of said sheet feed roller is so determined that said sheet is fed for a predetermined length until said roller is stopped at a predetermined position after said sheet feed roller starts rotating from a predetermined position, and said stopping means being put into operation immediately before said sheet feed roller completes said amount of rotation, and said stopping means being interrupted said operation thereof at the time that said sheet feed roller completes said amount of rotation, whereby said sheet is cut by a predetermined length. This roll sheet feeding device has a simple construction and has little or no variation in length of cut sheet, even at a high sheet feeding speed. Two or more sheet lengths can be selected by selecting the diameter and the amount of rotation of the sheet feed roller in this roll sheet feeding device.

4 Claims, 4 Drawing Figures

ROLL SHEET FEEDING DEVICE

BACKGROUND OF THE INVENTION

This invention relates to a roll sheet feeding device, wherein a lengthwise sheet in a roll form may be cut at a desired length selected from several kinds of predetermined lengths.

In a prior art, roll sheet feeding device for use in a copying machine, wherein the lengthwise sheet in the roll form is cut by a given length and a cut sheet is automatically fed to a succeeding step, there has been adopted a process for cutting the travelling roll sheet by a given length without interrupting the travelling. More in detail, the process has been such that, during copying operations, a sheet feed roller is started at a given timing so as to feed a roll sheet, and when the roll sheet is fed by a length commensurate to the length of an original, a cutter is operated to cut the roll sheet by a given length. With such a process in which a cutter is operated while the roll sheet is being travelled, no substantial problem arises so long as a sheet feeding speed is low. If, on the other hand, the cutting timing of the cutter is shifted only to a small extent in the case of a high feeding speed, this small shift leads to a large variation in length of sheet cut, thus resulting in a large difference or error in length of cut sheet. Futhermore, the operation of the cutter would badly affect the travelling of the roll sheet, particularly in an image-formed area thereof, thus causing a blurred image.

With a view to solving the above drawback, an attempt has been proposed, in which the roll sheet is stopped to be cut by a given length immediately before the cutter is put into operation. In such a device, a sheet path between a sheet feeding station and an image forming station need be curved for slackening the roll sheet, in order that the sheet travels smoothly, particularly in an image-formed area of the sheet, so as to prevent formation of a blurred image. Such a device, however, impairs accuracy in performance of a mechanism for controlling the starting and stopping of the roll sheet, namely in engagement and disengagement of a clutch for starting and interrupting the sheet feed roller.

The prior art device of the type incorporates a clutch mechanism as shown by way of example in FIG. 1. A drive-side boss 1 and a driven-side or idler side boss 2 are mounted on a common shaft adjacent to each other. Drive-side boss 1 has a diameter larger to some extent than driven-side boss 2. A coil spring 3 is wound on drive-side boss 1 and fixed thereto. Part of coil spring 3 is wound also on driven-side boss 2 with a small space between the coil spring 3 and the outer periphery of the driven-side boss 2, because the diameter of boss 2 is smaller than that of drive-side boss 1. A brake ring 5 operated by a solenoid 4 is fitted on the left extremity (in FIG. 1) of coil spring 3 on the driven-side boss 2, so that a braking action may be applied to coil spring 3 when solenoid 4 is energized. A direction of turns of coil spring 3 on the driven side is opposite to the rotating direction on the driving side. If solenoid 4 remains inoperative, drive-side boss 1 on the driving side and spring 3 on the driving side are integrally rotated, with driven-side boss 2 remaining stationary. When solenoid 4 becomes energized, then brake ring 5 is pulled to apply a braking action to the left extremely of coil spring 3 wound on the driven side. Coil spring 3 is thus coiled fast round the driven-side boss, with the resultant reduction in diameter of the driven-side spring, thus allowing driven-side boss 2 to rotate. When the activation of solenoid 4 is interrupted, brake ring 5 resumes its home position, and coil spring 3 becomes loose, whereby the rotation of the driven-side boss 2 is interrupted. If a sheet feed roller is connected to boss driven-side boss 2, then travel of a sheet may be started or interrupted by making solenoid 4 conducting or nonconducting.

The clutch so far described, however, involves many unstable factors in the process leading from the operation of solenoid 4 to the winding of coil spring 3 on the driven-side boss 2, and particularly, a duration of time from the operation of solenoid 4 to the starting of driven-side boss 2 is liable to change due to variation in coefficient of friction. This could be avoided by providing an increased force to solenoid 4, yet resulting in an increased loss in driving force, as well as increased wear of brake 5. Furthermore, in case that solenoid 4 is stopped to interrupt the rotation of the driven-side boss 2, there occurs various indefinite factors, such as a frictional force and inertia on the driven-side, until rotation on the driven-side is stopped, and such constitutes decisive factors to make variable a duration of time from the deenergization of solenoid 4 to the stop of the driven-side boss 2. Because of the failure of providing an accurate timing between the operation of solenoid 4 and the starting and stopping of the driven-side boss 2, a position at which the sheet stops cannot be controlled in an accurate manner, resulting in the lowered accuracy in cut length of the sheet, particularly in case that a sheet feeding speed is high.

SUMMARY OF THE INVENTION

It is accordingly an object of the present invention to provide a roll sheet feeding device, which is simple in construction, highly accurate in length of sheet to be cut, and hence allows a roll sheet to be fed at a high speed.

One of the features of the present invention consists in that, on the midway of a passage through which rotation drive is transmitted to a sheet feed roller, there is provided a means for stopping the sheet feed roller at one or more predetermined points; and a diameter of the sheet feed roller and an amount of rotation of the roller are determined so as to feed a roll sheet by a given length within a duration of time from the starting of the sheet feed roller from a given point to the stopping at any of said points; the aforesaid stopping means being put into operation before the sheet feed roller completes a given amount of rotation and then the rotation of the sheet feed roller is interrupted when the roller has accomplished the given amount of rotation, whereby the sheet having a given length form may be fed constantly regardless of the feeding speed.

These and other objects and features of the invention will be apparent from the ensuing part of the specification in conjunction with the drawings which indicate preferred embodiments of the invention.

DESCRIPTION OF THE PREFERRED EMBODIMENTS

Figure 1:
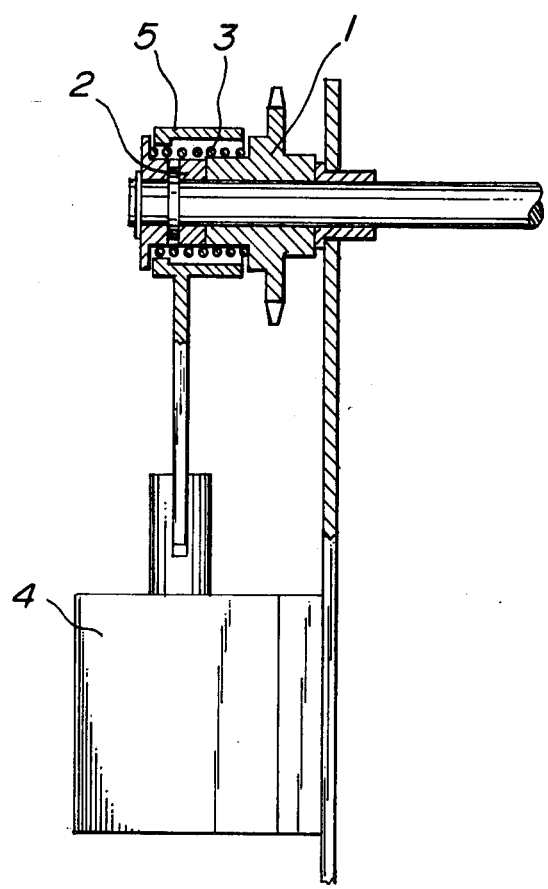
FIG. 1 is a schematic cross sectional view of a clutch mechanism incorporated in a prior art sheet feeding device.
Figure 2:
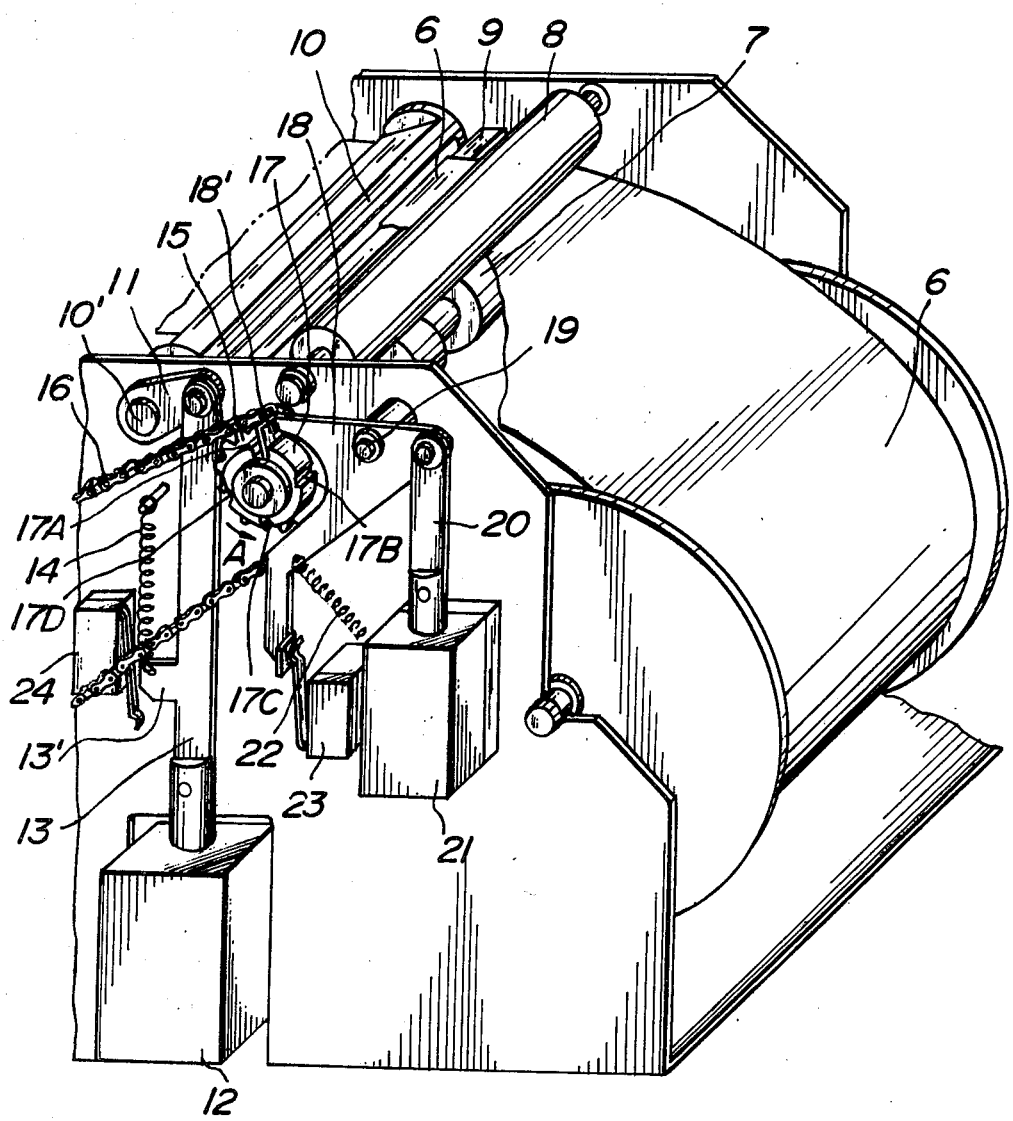
FIG. 2 is a schematic perspective view of a sheet feeding device according to the present invention.

FIG. 2 is a perspective view of one embodiment of a sheet feeding device according to the present invention. A sheet in the roll form 6 is fed by a lower sheet feed roller 7 and an upper pinch roller 8 to a cutter portion which is composed of a stationary blade 9 and a rotary blade 10. A lever 11 is mounted on a rotary shaft 10' of rotary blade 10 and connected to a solenoid 12 by means of a connecting rod 13. Connecting rod 13 is normally springbiased upwards by a spring 14. When solenoid 12 is energized so that solenoid 12 operates, then rotary blade 10 of cutter is rotated through the intermediary of connecting rod 13 and lever 11 against the force of spring 14, thereby cutting roll sheet 6 by a given length. When the supply of current to solenoid 12 is interrupted, connecting rod 13 is biased upwards by the force of spring 14, thereby returning rotary blade 10 to its home position.

An endless chain 16 is used for coupling a driving source (not shown) to a chain wheel 15, which is connected by means of a clutch to sheet feed roller 7 for driving the same. A stop lever 18 is pivotally supported by a shaft 19, which in turn is attached to the body of the copying machine. Stop lever 18 is connected by way of a connecting rod 20 to a sheet solenoid 21. Stop lever 18 is normally springloaded counterclockwise by a spring 22 and adapted to effect a clockwise movement only when solenoid 21 is put into operation, so that a pawl portion 18' of the stop lever will be released from a radial groove 17A provided in the outer peripheral surface of stop ring 17. In this embodiment, four radial grooves 17A to 17D are provided in the outer peripheral surface of stop ring 17 at an angular spacing of 90° from each other. A microswitch 23 is so arranged as to be brought into an ON position when stop lever 18 rotates clockwise to assume a position related to microswitch 23, so that the current may be supplied to solenoid 12 for actuating the cutter. Another microswitch 24 is positioned in a manner to be operated by connecting rod 13, so that when solenoid 12 is operated to pull connecting rod 13 downwards, the microswitch 24 will be brought into an OFF position by a projection 13' of rod 13, thereby interrupting the supply of current to solenoid 12. If the solenoid 21 is deenergized, the spring 22 causes the lever 18 to rotate about the shaft 19 in a counterclockwise direction. However the pawl 18' of the lever 18 is restricted by the outer peripheral surface of the stop ring 17 so that the lever 18 is left as it is.

But, the stop ring 17 is rotated in the direction shown by an arrow A until one of the grooves 17A to 17D (in FIG. 2, 17A) arrives at the pawl 18' of the lever 18. The spring 22 then causes the pawl 18' of the lever 18 to drop into the groove 17A. At the same time, the front end portion of the lever 18 causes the operating piece of the microswitch 23 to operate so as to energize the solenoid 12. If the solenoid 12 becomes ON, the connecting bar 13 is pulled downwardly to rotate the lever 11 engaged with the connecting bar 13 about the rotary shaft 10' in a clockwise direction. At the same time, the cutter 10 secured to the rotary shaft 10' is rotated to cut the roll sheet into a given length. If the pawl 18' of the lever 18 is dropped into the groove 17A, the stop ring 17 becomes stopped to stop the rotation of the sheet feed roller 8, thereby stopping the sheet feed operation.

Upon termination of this movement, microswitch 24 is brought into an OFF position, so that the current to solenoid 12 is interrupted, and rotary blade 10 resumes its home position. The series of these steps are automatically performed in succession. In order to feed the roll sheet for a subsequent copying operation, it is necessary to energize solenoid 21 and to disengage pawl 18' of lever 18 from groove 17A.

Figure 3:
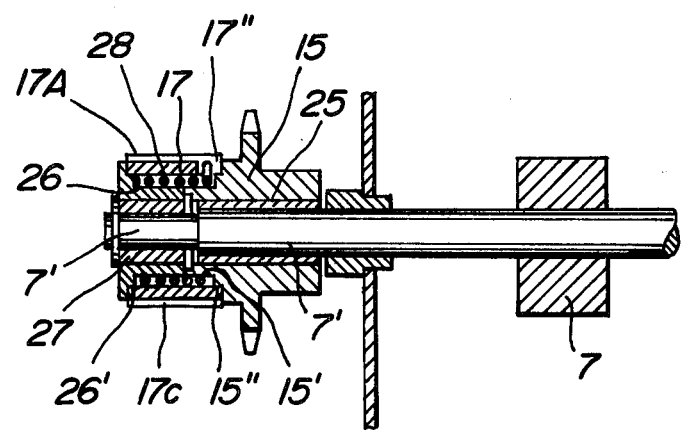
FIG. 3 is a cross sectional view of a clutch mechanism incorporated in the sheet feeding device of the invention; and, FIG. 4 is a perspective view of an external appearance of a copying machine using the sheet feeding device.

A clutch mechanism will be explained in more detail with reference to FIG. 3. Reference numerals 7, 15 and 17 in FIG. 3 represent sheet feed roller, chain wheel and stop ring as shown in FIG. 2, respectively. Chain wheel 15 is rotatably mounted through the intermediary of a bearing metal 25 on each exterior portion 7' of the shaft of sheet feed roller 7, which portion projects from the copying machine body. A boss 26 on the clutch driven side is mounted through the intermediary of a one-way clutch 27 on each externally extending portion 7' of the shaft of sheet feed roller 7, adjacent to chain wheel 15. Chain wheel 15 has a boss equal in diameter to clutch-driven-side boss 26 and serving as a boss 15' on the clutch driving side. A coil spring 28 is wound on these driven- and driving-side bosses 26 and 15' over the entire length thereof. An inner diameter of coil spring 28 is smaller to some extent than a diameter of each boss 26 or 15', and the direction of turn of this coil spring 28 is counterclockwise in this embodiment. Stop ring 17 is fitted on coil spring 28 in a manner to surround the same and to be rotatably retained by boss portions 15" and 26' having diameters larger than those of boss portions 15' and 26, respectively, on the driving- and driven-sides.

One-way clutch 27 is provided for the purpose of manually turning sheet feed roller 7 in a direction of feeding a sheet, so as to bring the leading edge of sheet into the bite of sheet feed roller 7 and pinch roller 8. When it is desired to turn sheet feed roller 7 from the side of chain wheel 15, namely, from the driving side, then the direction of rotation is reversed. For this reason, driven-side boss 26 and sheet feed roller 7 are rigidly secured to each other. This clutch 27, however, is independent of the operation of the device according to the present invention, and hence no further description is given thereto.

When chain wheel 15 is rotated in the direction of arrow A in FIG. 2 by the driving source not shown, then coil spring 28 will be tightly wound on respective bosses 26 and 15', whereby both bosses will be driven integrally, without being slipped. The driving force is thus transmitted from chain wheel 15, by way of driving-side boss 15', the driven-side boss 26 and shaft 7', to sheet feed roller 7. In FIG. 3, coil spring 28 is shown as being roughly coiled, but preferably would be a closely coiled spring. Coil spring 28 is bent at the end on the driving-side so as to be loosely fitted in an end groove 17" of stop ring 17. Thus, stop ring 17 may be rotated together with spring 28 during the rotation of sheet feed roller 7. If stop ring 17 is forcibly stopped at this time, then the coil spring will also be stopped. At this time, coil spring 28 is twisted in a direction of being slackened due to the friction between coil spring 28 and driving-side boss 15', whereas the inner diameter of coil spring 28 becomes increased to some extent, to thereby release driven-side boss 26 from engagement with boss 15' on the driving-side, so that rotation of the driven-side boss is stopped, while the driving-side boss continues to rotate without suffering a large resistance. Even if chain wheel 15 and the driving-side boss 15' are alway kept rotating by a drive force from the driving source, driven-side boss 26 as well as sheet feed roller 7 may be stopped without imposing any mechanical burden on respective portions by stopping forcibly stop ring 17, and the sheet feed roller 7 may be started again by releasing stop ring 17 from the locked position.

The operation of the sheet feeding device according to the present invention, will be described hereinafter. Chain wheel 15 is rotated in the direction of arrow A in FIG. 2 by way of chain 16 by means of a driving source provided in the body of the copying machine. At this stage, if no current is supplied to solenoid 21, stop lever 18 will remain biased counterclockwise under the force of spring 22. When stop ring 17 is rotated until groove 17A assumes a position of receiving therein pawl 18', then pawl 18' will be fitted in groove 17A, thereby forcibly stopping stop ring 17 at that position. The rotation of sheet feed roller 7 is thus stopped. At this stage, the sheet in the roll form is held between sheet feed roller 7 and pinch roller 8, with its leading edge coincident with the position of stationary blade 9 of the cutter.

When current is fed to solenoid 21, and lever 18 is pivotally moved clockwise until pawl 18' disengages from groove 17A, then stop ring 17 becomes free to rotate, thus allowing the sheet feed roller 7 to rotate. Sheet feed roller 7 continues to rotate, as long as solenoid 21 is supplied with the current. When the supply of the current to solenoid 21 is interrupted so as to render solenoid 21 inoperative, then lever 18 will be biased counterclockwise under the force of spring 22, and stop ring 17 will be rotated to receive pawl 18' in groove 17A, whereby stop ring 17 as well as sheet feed roller 8 will be stopped. Simultaneously with the above movement, microswitch 23 will be rendered to the ON position by means of lever 18, thereby rotating rotary blade 10 to cut roll sheet 6 by a given length. It is understood from the foregoing that the timing at which the travel of sheet is stopped is not dependent on the timing of interruption of the current supply to solenoid 21, but on a time at which the groove 17A in stop ring 17 first meets pawl 18' after the interruption of the supply of the current to solenoid 21. In connection with this operation, a roll sheet is automatically cut at a given position.

A diameter of sheet feed roller 7 is determined in consideration of a desired length of the sheet to be cut. For example, when it is desired to prepare a copy of an A-4 size by cutting a roll sheet having a width of 210 mm by a length of 297 mm, a sheet feed roller of 23.63 mm in diameter can be used. In this case, roll sheet 6 may be fed by a length of 297 mm by rotating the roller 7 four times on cycles. In such arrangements, after solenoid 21 has been put into operation (prior to the operation of solenoid 21, pawl 18' is in engagement with groove 17A, and the roll sheet has been just cut by a given length, with the trailing end of a cut sheet and the leading edge of the roll sheet positioned on lines with blades 9 and 10, respectively) and the feed of the roll sheet 6 has been started, the supply of the current to solenoid 21 is interrupted just before sheet feed roller 7 starts the fifth rotation, and then sheet feed roller 7 completes the fourth rotation accurately when pawl 18' and groove 17A meet each other. As a result, the roll sheet is fed by an exact length of 297 mm. Thereafter the cutter is operated to cut the roll sheet by the exact length of 297 mm.

According to the present invention, a length of the roll sheet to be cut is controlled by the diameter of the sheet feed roller and the number of rotations of the sheet feed roller. The number of rotations of the sheet feed roller may be determined accurately by the engagement of pawl 18' with groove 17A, resulting in the accurate cutting length of the sheet to be cut. For example, in this embodiment, if a timing of a signal for stopping solenoid 21 falls in a time duration from the instant that the sheet feed roller has entered the fourth rotation and groove 17D has passed the position of pawl 18' and to the instant that sheet feed roller 7 enters its fifth rotation, then the sheet feed roller may effect the four cycles of rotation exactly and be stopped, for the cutting of the roll sheet into a given length. When it is desired to cut roll sheet 6 by a different length, it is only necessary to change an amount of rotation of sheet feed roller 7. This is readily achieved by changing the number of rotations of the sheet feed roller 7, and by properly selecting a groove with which pawl 18' is in engagement at the sheet-feed-starting position, and a groove with which pawl 18' is brought into engagement at the stopping position. In any case, it is sufficient that a stop signal is produced at a timing corresponding to a position between a groove positioned at a point at which the roller is to stop and the preceding groove. The timing of producing such a stop signal need not be so accurate. This affords the use of a signal generating means having a comparatively simple construction. For example, in the embodiment so far described, microswitch may be provided on a photosensitive drum, an original support, or a control panel provided for the purpose of producing the stop signal and projections and depressions are provided in such a drum, original support or control panel, so that this microswitch is controlled by these depressions and projections in a manner that the microswitch is brought into the OFF position at a desired timing between groove 17D and groove 17A during the fourth rotation of sheet feed roller 7, and that the microswitch remains at the OFF position until the feeding of the roll sheet is started again so that the current may be supplied through the microswitch to the solenoid.

Figure 4:
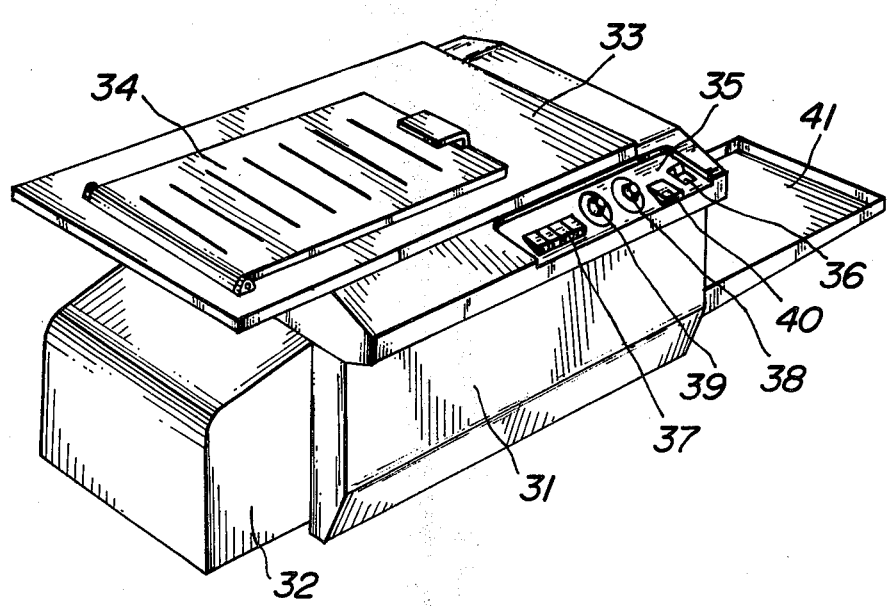

FIG. 4 is a perspective view of an external appearance of a copying machine in which the sheet feeding device according to the present invention is incorporated. A reference numeral 31 denotes a copying machine body, 32 a sheet feeding portion containing therein a sheet in the roll form, 33 an original support, 34 an original holder, and 35 an operating portion or control panel. In operation, an operator throws a main switch to the ON position, and places an original under original holder 34. If the original is a size of 21.59×27.94 cm (8.8×11 inches), the operator has to check up whether a roll sheet having a width of 21.59 cm is set in the sheet feeding portion. Then, the operator determines a length of sheet to be cut by setting a cutting length setting dial 37 at a position corresponding to the sheet length of 27.94 cm and then sets a copy number setting dial 38 at the desired number of copies and a contrast adjusting dial 39 at a desired contrast value. The operator then presses a copy button 40, so that the desired number of copies having a size of 21.59×27.94 cm are delivered to a copy tray 41. If an original has a size of 21.59×33.02 cm (8.5×13 inches), then a length of 33.02 cm is selected by setting cutting length setting dial 37 at this length. A cutting length of 35.56 cm (14 inches) or 43.18 cm (17 inches) may be selected by manipulating this setting dial 37.

The sheet feeding device employed in this embodiment is similar in construction to the device shown in FIGS. 2 and 3, with the exception that stop ring 17 is provided with three radial grooves at an equi-angular spacing from each other in the outer peripheral surface thereof, and that a sheet feed roller having a diameter of 24.26 mm is used. In this embodiment, in order to obtain a cut sheet of 27.94 cm (11 inches) in length, the sheet feed roller 7 need be rotated three and two-thirds times. It follows that for a length of cut sheet of 33.02 cm, 4⅓ rotations are required, for 35.56 cm, 4⅔ rotations, and for 43.18 cm, 5⅔ rotations, respectively. In case there is used a stop ring having two or more radial grooves at an equi-angular spacing from each other in the outer peripheral surface thereof, a length of sheet being cut may be set to values equal to an integer multiple of a length of arc of sheet feed roller which corresponds to a distance between the neighboring radial grooves in the stop ring. These values are shown in Table 1.

Table 1

| Number of grooves in the stop ring | Diameter of the feed roller (mm) | Number of rotations each length of sheet to be cut | | | |
|---|---|---|---|---|---|
| | | 27.94 cm | 33.02 cm | 35.56 cm | 43.18 cm |
| 1 | 8.09 | 11 | 13 | 14 | 17 |
| 2 | 16.17 | 5½ | 6½ | 7 | 8½ |
| 3 | 24.26 | 3⅔ | 4⅓ | 4⅔ | 5⅔ |
| 4 | 32.34 | 2¾ | 3¼ | 3½ | 4¼ |
| 5 | 40.43 | 2 1/5 | 2 3/5 | 2 4/5 | 3 2/5 |

In actual use of the sheet feeding device of the present invention, the number of grooves and a diameter of the sheet feed roller may be properly selected from the above values in Table 1.

Examples of calculation in the case of the production of four kinds of copies of A-3 size, B-4 size, A-4 size and B-5 size are given below. Copies of A-3 size and A-4 size are obtained by cutting a roll sheet of 297 mm in width by a length of 420 mm and a length of 210 mm, respectively. For production of copies of B-4 size and B-5 size, a roll sheet of 257 mm in width is cut into a length of 346 mm and a length of 182 mm, respectively. The greatest common measure for these four different lengths of sheet to be cut is 14 mm, and accordingly if the number of grooves and a diameter of the sheet feed roller are selected so as to provide an arc length of 14 mm for the sheet feed roller, which extends between the neighboring grooves in the stop ring, then the sheet in the roll form may be cut by four different lengths. There are shown in Table 2 the number of rotations of a sheet feed roller with respect to the cut sheets of respective lengths, in case the number of grooves in the stop ring and a diameter of the sheet feed roller are selected in the manner described.

Table 2

| Number of grooves in the stop ring | Diameter of the feed roller (mm) | Number of rotations each length of sheet to be cut | | | |
|---|---|---|---|---|---|
| | | 420 (mm) | 210 (mm) | 364 (mm) | 182 (mm) |
| 1 | 4.46 | 30 | 15 | 26 | 13 |
| 2 | 8.91 | 15 | 7½ | 13 | 6½ |
| 3 | 13.37 | 10 | 5 | 8⅔ | 4⅓ |
| 4 | 17.83 | 7½ | 3¾ | 6½ | 3¼ |
| 5 | 22.28 | 6 | 3 | 5 1/5 | 2 3/5 |

Table 2-continued

| Number of grooves in the stop ring | Diameter of the feed roller (mm) | Number of rotations each length of sheet to be cut | | | |
|---|---|---|---|---|---|
| | | 420 (mm) | 210 (mm) | 364 (mm) | 182 (mm) |
| 6 | 26.74 | 5 | 2½ | 4⅓ | 2 1/6 |
| 7 | 31.19 | 4 2/7 | 2 1/7 | 3 5/7 | 1 6/7 |
| 8 | 35.65 | 3¾ | 1⅞ | 3¼ | 1⅝ |

Suitable values can be selected from the above values listed in Table 2 by considering the construction of the copying machine. For example, selection of a stop ring having 6 grooves and a sheet feed roller having a diameter of 26.74 mm may be suitably selected for the sheet feeding device.

Also in this embodiment, the timing of interrupting the supply of the current to solenoid 21 can be determined roughly. Accordingly, four microswitches may be used in a manner that these microswitches are rendered to the ON or OFF position at a timing commensurate to respective lengths of the sheet to be cut, and the signals provided by these four microswitches are selected by means of sheet-lengthsetting dial 37.

What has been described should not be construed as being in a limitative sense. It will be apparent for those skilled in the art that a combination of sizes of sheet being cut is versatile, for example, a combination of sizes by inch with various A-sizes and/or various B-sizes is permitted, as a matter of course. The clutch mechanism is not limited to a spring clutch, but may be electromagnetic clutch, fluid clutch, powder clutch, or any other mechanical clutch.

According to the present invention, there is provided a device for feeding a sheet in the roll form which is simple in construction and has little or no variation in length of cut sheet. With a prior art sheet feeding device, a difference in length of cut sheet in the range of 2 to 3 mm has been incurred even at a sheet feeding speed of 100 mm/sec. In comparison with this, it has been found that the sheet feeding device according to the invention reduces a difference in length of cut sheet to less than 0.5 mm even at a higher sheet feeding speed of 160 mm/sec. According to the present invention, there is provided a sheet feeding device wherein two or more different lengths of sheet to be cut may be selected by using a mechanism which is simple in construction. Copies with the minimum difference in length provide convenience in the case of binding them as well as handling them, and presents neat appearance.

What is claimed is:

1. A roll sheet feeding device comprising: a sheet feed roller for feeding a roll sheet; and a stopping means for stopping said sheet feed roller at least one predetermined position, said means being provided in a midway of a passage through which a driving force is to be transmitted to said sheet feed roller; a diameter and an amount of rotation of said sheet feed roller is so determined that said sheet is fed for a predetermined length until said roller is stopped at a predetermined position after said sheet feed roller starts rotating from a predetermined position; said stopping means being said stopping means being placed into operation before said sheet feed roller completes said amount of rotation, and said stopping means halts rotation of said sheet feed roller at a time when said sheet feed roller completes said amount of rotation; and cutting means operatively engaged with said stopping means when said stopping means halts rotation of said sheet feed roller, whereby said sheet is cut by said cutting means into a predetermined length.

2. A sheet feeding device as claimed in claim 1, wherein there are provided two or more stopping positions on the circumference of said sheet feed roller by dividing said circumference of said sheet feed roller by integers; and said diameter of said sheet feed roller and the stopping positions of said sheet feed roller are determined in a manner that a length that said sheet is fed until said sheet feed roller stops at one of said stopping positions after said sheet feed roller starts rotating from one of said stopping positions corresponds to one of a plurality of feed lengths of said sheet by selecting one of said stopping positions of said sheet feed roller.

3. A roll sheet feeding device as claimed in claim 1, wherein said stop means consists of an annular member having at least one radial groove, and a lever having a pawl portion engageable with one of said radial grooves, whereby the sheet feed roller is stopped at a desired position by the engagement of said pawl member with one of said radial grooves.

4. A roll sheet feeding device as claimed in claim 3, wherein said annular member is free to rotate at the time that said lever rotates clockwise, thereby allowing said sheet feed roller to rotate by a desired amount.

* * * * *